United States Patent

Inamura

[11] Patent Number: 5,873,577
[45] Date of Patent: Feb. 23, 1999

[54] METAL LAMINATE GASKET WITH PARTIAL BEAD SECTION

[75] Inventor: Susumu Inamura, Utsunomiya, Japan

[73] Assignee: Ishikawa Gasket Co., Ltd., Tokyo, Japan

[21] Appl. No.: 858,440

[22] Filed: May 19, 1997

[30] Foreign Application Priority Data

May 22, 1996 [JP] Japan .................................. 8-126689

[51] Int. Cl.⁶ .................................................. F02F 11/00
[52] U.S. Cl. ............................................ 277/594; 277/593
[58] Field of Search .................................. 277/591, 593, 277/594, 595, 600

[56] References Cited

U.S. PATENT DOCUMENTS

| | | | |
|---|---|---|---|
| 4,405,138 | 9/1983 | Skrycki | 277/591 |
| 4,721,315 | 1/1988 | Ueta | 277/593 |
| 4,896,891 | 1/1990 | Udagawa | 277/593 |
| 5,058,908 | 10/1991 | Udagawa | 277/595 |
| 5,094,468 | 3/1992 | Hieble | 277/591 |
| 5,295,699 | 3/1994 | Inoue | 277/591 |
| 5,297,807 | 3/1994 | Udagawa | 277/593 |

FOREIGN PATENT DOCUMENTS

| | | |
|---|---|---|
| 0 486 150 | 5/1992 | European Pat. Off. . |
| 0 580 427 | 1/1994 | European Pat. Off. . |
| 1388128 | 3/1975 | United Kingdom . |

Primary Examiner—Anthony Knight
Assistant Examiner—Greg Binda
Attorney, Agent, or Firm—Kanesaka & Takeuchi

[57] ABSTRACT

A metal laminate gasket for an internal combustion engine is formed of a first metal plate, a second metal plate situated under the first metal plate, and a plurality of annular plates. The first metal plate includes a base portion, a plurality of curved portions extending from the base portion to define first holes, and a plurality of flanges extending from the curved portions to be disposed over the base portion. Each annular plate is situated between each flange and the base portion, and has at least one flat section and at least one partial bead section disposed at an intermediate portion between the first holes. The partial bead does not extend throughout an entire length of the annular plate. Therefore, when the gasket is tightened, the surface pressure at the intermediate portion can be increased to securely seal thereat. In case the rigidity of a cylinder head is not strong, the gasket is especially useful.

7 Claims, 2 Drawing Sheets

METAL LAMINATE GASKET WITH PARTIAL BEAD SECTION

BACKGROUND OF THE INVENTION AND RELATED ART STATEMENT

The invention relates to a metal laminate gasket with partial bead sections to securely seal around cylinder bores.

An internal combustion engine has been developed to provide high power and light weight. For this purpose, a cylinder head is made of light metal, such as aluminum alloy, and the distance between cylinder bores is reduced as little as possible. In this kind of an engine, since the rigidity of the cylinder head is not so strong, when the cylinder head is fixed to a cylinder block, a middle portion of the cylinder head is liable to project upwardly.

On the other hand, a cylinder head gasket installed between the cylinder head and the cylinder block has been made to satisfy the requirement of the engine. Since a metal laminate gasket is strong against high temperature and has a durability, the metal laminate gasket has been used widely.

In order to form a light weight metal laminate gasket, it is preferable to reduce a number of metal plates laminated together. Therefore, a metal gasket formed of two metal plates has been used. In the gasket formed of two metal plates, however, it is difficult to securely seal around the cylinder bores especially when the cylinder head deforms due to the insufficient rigidity as explained above.

In order to form a strong and wide sealing area around a hole to be sealed, U.S. Pat. No. 4,896,891 and U.S. Pat. No. 4,938,488 have been proposed. Although these patents provide strong and wide sealing areas, in case the rigidity of the cylinder head and the cylinder block is not strong, these gaskets are not proper.

In view of the foregoing, the present invention has been made, and an object of the invention is to provide a metal laminate gasket, which can prevent reduction of a surface pressure at a sealing portion even if the rigidity of the cylinder head is not strong.

Another object of the invention is to provide a metal laminate gasket as stated above, wherein the surface pressure to be formed around a hole can be adjusted easily.

A further object of the invention is to provide a metal laminate gasket as stated above, wherein the surface pressures around the cylinder bores can be adjusted easily with reference to the overall distribution thereof.

Further objects and advantages of the invention will be apparent from the following description of the invention.

SUMMARY OF THE INVENTION

A metal laminate gasket of the invention is used for an internal combustion engine having a plurality of cylinder bores. The gasket is formed of a first metal plate, a second metal plate situated under the first metal plate, and a plurality of annular plates.

The first metal plate includes a base portion extending substantially throughout an entire area of the gasket; a plurality of first holes formed in the base portion and corresponding to the cylinder bores of the engine; at least one intermediate portion situated between the first holes; a plurality of curved portions extending from the base portion, each curved portion defining each first hole; and a plurality of flanges. Each flange extends from each curved portion and is disposed over the base portion.

Each annular plate is situated between each flange and the base portion, and has at least one partial bead section disposed at the intermediate portion between the first holes, and at least one flat section. The partial bead section does not extend throughout the entire length of the annular plate. The second metal plate is situated on the base portion at a side where the flanges are located.

In the invention, the partial bead sections of the annular plates are situated at the intermediate portion between the cylinder bores. Therefore, when the cylinder head and the cylinder block are assembled together, in case the cylinder head projects slightly upwardly due to the insufficient rigidity of the cylinder head, the partial bead sections provide surface pressures at the intermediate portion. Thus, the intermediate portion between the cylinder bores can be securely sealed.

If the bead is formed entirely around the cylinder bore, the surface pressure at the intermediate portion can not be partially increased. Therefore, if the rigidity of the cylinder head is not so strong, the round bead may cause leakage at the intermediate portion. In the invention, since the partial bead section is located on the intermediate portion, the intermediate portion is securely sealed to prevent leakage thereat.

In the invention, in case the annular plate is changed, the thickness of the annular plate and the height of the partial bead section can be changed. Therefore, if the annular plate is changed, the desired surface pressure can be easily obtained. It is possible to adjust the surface pressures with reference to the overall distribution of the surface pressures.

Preferably, each annular plate includes two partial bead sections and two flat sections alternately arranged with each other. In this case, the partial bead sections of the annular plates are situated along the longitudinal direction of the gasket.

Each partial bead section includes a central portion and two longitudinal end portions. Each end portion gradually changes a height from the flat section to the central portion.

The thickness of the annular plate is preferably less than the thickness of the first or second metal plate. Also, the thickness at the flange portion is greater than that outside the flange portion. Accordingly, the gasket can securely seal around the cylinder bores.

DETAILED DESCRIPTION OF A PREFERRED EMBODIMENT

Figure 1:
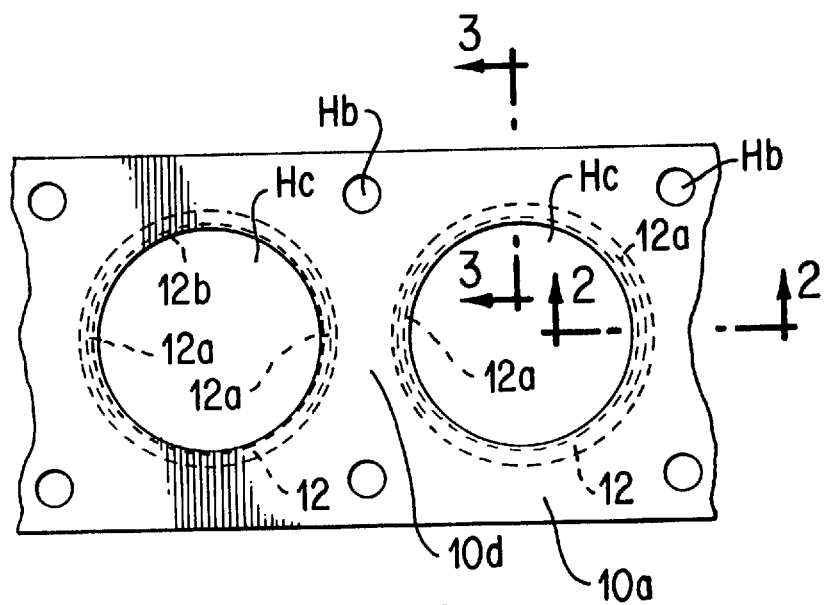
FIG. 1 is an explanatory partial plan view of a metal laminate gasket of the invention.
Figure 2:
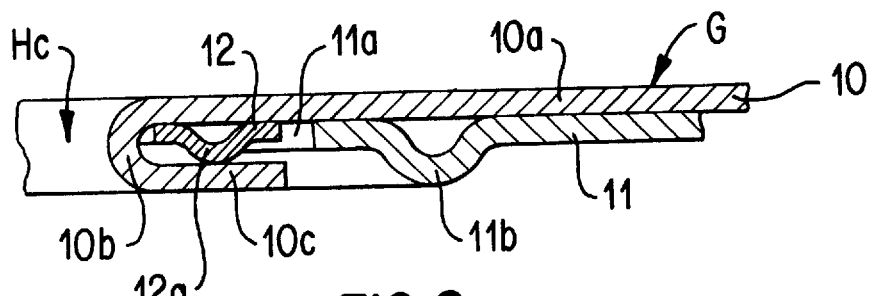
FIG. 2 is an enlarged sectional view taken along line 2—2 in FIG. 1.
Figure 3:
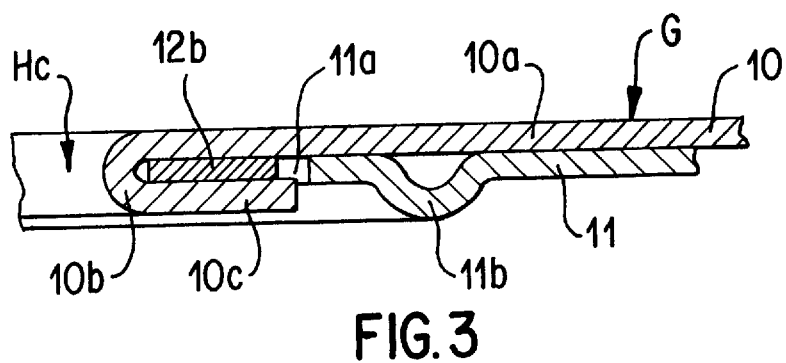
FIG. 3 is an enlarged sectional view taken along line 3—3 in FIG. 1.

A preferred embodiment of a gasket G of the invention is explained with reference to the drawings. The gasket G is a cylinder head gasket, and includes a plurality of cylinder bores Hc arranged side by side in a longitudinal direction of the gasket, and a plurality of bolt holes Hb. The gasket also includes a plurality of water holes and oil holes (not shown), as in the conventional gasket. Since the invention is directed to the sealing mechanisms around the cylinder bores, the sealing mechanism thereof is only explained. The gasket G may use any sealing mechanisms for other holes.

The gasket G is formed of an upper plate 10, a lower plate 11 situated under the upper plate 10, and annular plates 12 situated around the cylinder bores Hc.

The upper plate 10 includes a base portion 10a extending substantially throughout an entire area of the gasket, curved portions 10b extending from the base portion 10a, and flanges 10c extending from the respective curved portions 10b. The flange 10c has an annular shape and is located under the base portion 10a. The curved portion 10b defines the cylinder bore Hc.

The lower plate 11 has holes 11a, and beads 11b surrounding the holes 11a, respectively. Each hole has a diameter greater than the size or diameter of the flange 10c. When the upper and lower plates 10, 11 are assembled, the flange 10c is located inside the hole 11a, and the bead 11b extends in a direction away from the upper plate 10.

Figure 4:
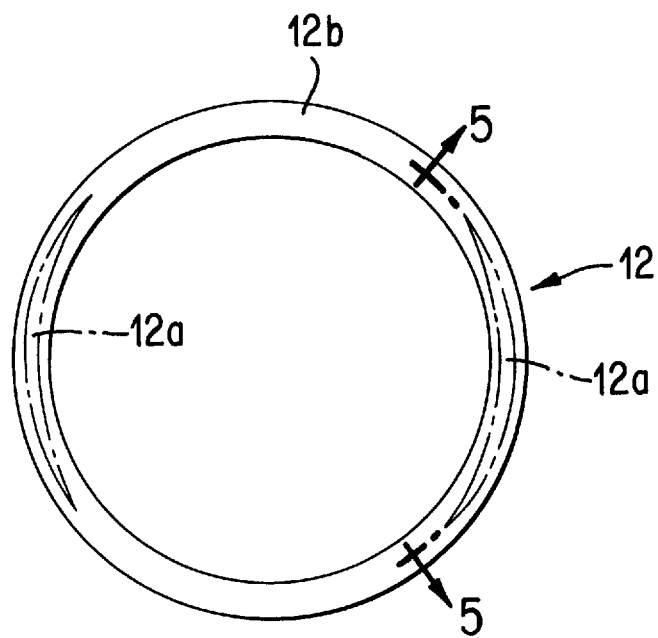
FIG. 4 is an enlarged plan view of an annular plate.
Figure 5:
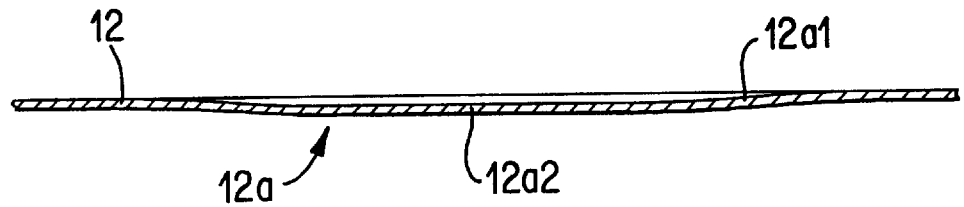
FIG. 5 is a sectional view taken along line 5—5 in FIG. 4.

The annular plate 12 has a ring shape and is disposed between the flange 10c and the base portion 10b. The annular plate 12 has the width substantially the same as that of the flange 10c. As clearly shown in FIGS. 4 and 5, the annular plate 12 has two partial bead sections 12a, and two flat sections 12b alternately arranged to each other.

Each bead section 12a has two end portions 12a1 and a central portion 12a2 situated between the end portions 12a1. The central section 12a2 has the constant width and height, but the end portion 12a1 has the width and height gradually decreasing from the central section 12a2 toward the flat section 12b.

The annular plate 12 has the thickness less than that of the upper or lower plate 10, 11. The total thickness at a flange portion, i.e. flange, base portion and annular plate, is greater than the total thickness outside the flange portion, i.e. base portion and lower plate. In the gasket G, thus, the flange portion constitutes a main sealing portion, and the bead 11b auxiliary seals around the main sealing portion.

When the annular plates 12 are assembled with the upper and lower plates 10, 11, the bead sections 12a are located at the intermediate portions 10d between the cylinder bores Hc. The bead sections 12a may be located at the longitudinal ends of the gasket. Namely, the bead sections 12a are arranged along the longitudinal direction of the gasket G.

In the engine, in case the rigidity of the cylinder head is not so strong, when the cylinder head and the cylinder block with the gasket therebetween is assembled and fixed together, the middle area of the cylinder head is liable to project upwardly. In this case, the intermediate portion between the cylinder bores Hc is not tightly compressed to thereby cause leakage at the intermediate portion.

In the invention, the bead sections 12a are located at the intermediate area between the cylinder bores. Therefore, when the gasket is tightened, the high surface pressure is formed thereat. Even if the cylinder head slightly projects upwardly at the middle area thereof when the engine is assembled, the bead sections 12a provide the high surface pressure to securely seal the intermediate portion.

In case a bead is formed around the entire area of the annular plate, when the gasket is tightened, the bead is entirely compressed. In this case, since a high surface pressure is not concentrated at the intermediate portion, a gas may leak at the intermediate portion.

In the invention, when the gasket is compressed, the flange portion forms the main sealing section to securely seal around the cylinder bore, and the bead 11b is compressed around the cylinder bore Hc to securely seal around the main sealing portion. Since the bead 11b is not completely compressed, the bead 11b does not creep.

In case the surface pressure around the cylinder bore Hc is changed, the annular plate 12 may be changed to another plate with a different thickness. Therefore, the surface pressure around the cylinder bore Hc can be adjusted easily without changing the upper or lower plate. Also, the arrangement or distribution of the surface pressures around the cylinder bores can be easily changed by changing the annular plates.

While the invention has been explained with reference to the specific embodiment of the invention, the explanation is illustrative, and the invention is limited only by the appended claims.

What is claimed is:

1. A metal laminate gasket for an internal combustion engine having a plurality of cylinder bores, comprising:

a first metal plate having a base portion extending substantially throughout an entire area of the gasket; a plurality of first holes formed in the base portion and corresponding to the cylinder bores of the engine; at least one intermediate portion situated between the first holes; a plurality of curved portions extending from the base portion, each curved portion defining each first hole; and a plurality of flanges, each flange extending from each curved portion and being disposed over the base portion, a plurality of annular plates, each annular plate being situated between each flange and the base portion and having at least one flat section and at least one partial bead section disposed at the intermediate portion without extending throughout an entire length of the annular plate, and a second metal plate situated over the base portion at a side where the flanges are located.

2. A metal laminate gasket according to claim 1, wherein each annular plate includes two partial bead sections and two flat sections alternately arranged with each other.

3. A metal laminate gasket according to claim 2, wherein said first holes are arranged side by side along a longitudinal direction of the gasket, said partial bead sections of the annular plates being situated along the longitudinal direction of the gasket.

4. A metal laminate gasket according to claim 1, wherein each partial bead section includes a central portion and two longitudinal end portions, each end portion gradually changing a height from the flat section to the central portion.

5. A metal laminate gasket according to claim 4, wherein each annular plate has a width substantially same as the width of the flange.

6. A metal laminate gasket according to claim 5, wherein said second metal plate has a plurality of second holes, each second hole having a size greater than an outer diameter of the flange so that when the gasket is assembled, the flange and the annular plate are located inside the second hole, and a plurality of beads, each bead being situated around the second hole to seal therearound.

7. A metal laminate gasket according to claim 6, wherein a thickness of the annular plate is less than thicknesses of the first and second metal plates.

* * * * *